(12) United States Patent
Shin et al.

(10) Patent No.: US 8,470,412 B2
(45) Date of Patent: Jun. 25, 2013

(54) LIQUID CRYSTAL ALIGNMENT AGENT, LIQUID CRYSTAL ALIGNMENT FILM MANUFACTURED USING THE SAME, AND LIQUID CRYSTAL DISPLAY DEVICE INCLUDING THE LIQUID CRYSTAL ALIGNMENT FILM

(75) Inventors: Myoung-Youp Shin, Uiwang-si (KR); Eun-Ha Kim, Uiwang-si (KR); Jae-Deuk Yang, Uiwang-si (KR); Yong-Sik Yoo, Uiwang-si (KR); Guk-Pyo Jo, Uiwang-si (KR); Jung-Gon Choi, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 99 days.

(21) Appl. No.: 13/238,450

(22) Filed: Sep. 21, 2011

(65) Prior Publication Data
US 2012/0172522 A1 Jul. 5, 2012

(30) Foreign Application Priority Data

Dec. 29, 2010 (KR) ........................ 10-2010-0137872
Jun. 29, 2011 (KR) ........................ 10-2011-0063966

(51) Int. Cl.
*G02F 1/1337* (2006.01)
(52) U.S. Cl.
USPC ....... 428/1.26; 428/1.2; 428/1.25; 428/473.5; 428/474.4; 528/125; 528/126; 528/310
(58) Field of Classification Search
USPC ... 428/1.2, 1.25, 1.26, 474.4, 473.5; 528/123, 528/125, 310
See application file for complete search history.

(56) References Cited

U.S. PATENT DOCUMENTS

| 2008/0293888 | A1* | 11/2008 | Bachels et al. | ................ 525/200 |
| 2009/0299014 | A1* | 12/2009 | Oh et al. | ........................ 525/412 |
| 2010/0085523 | A1 | 4/2010 | Terashita et al. | |

FOREIGN PATENT DOCUMENTS

| KR | 10-2009-0056926 A | 6/2009 |
| KR | 10-2009-0059989 A | 6/2009 |
| WO | 2007/071091 A1 | 6/2007 |

OTHER PUBLICATIONS

USPTO structure search, Jan. 2013.*

* cited by examiner

*Primary Examiner* — Gregory Listvoyb
(74) *Attorney, Agent, or Firm* — Summa, Additon & Ashe, P.A.

(57) ABSTRACT

Disclosed is a liquid crystal alignment agent that includes a polymer comprising polyamic acid including a repeating unit represented by the following Chemical Formula 1, polyimide including a repeating unit represented by the following Chemical Formula 2, or a combination thereof.

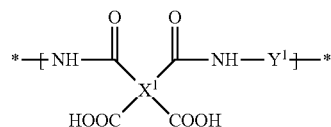

[Chemical Formula 1]

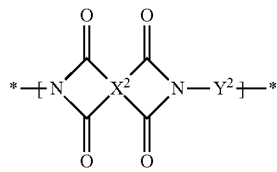

[Chemical Formula 2]

In Chemical Formulae 1 and 2, $X^1$, $X^2$, $Y^1$ and $Y^2$ are the same in the detailed description.

9 Claims, 1 Drawing Sheet

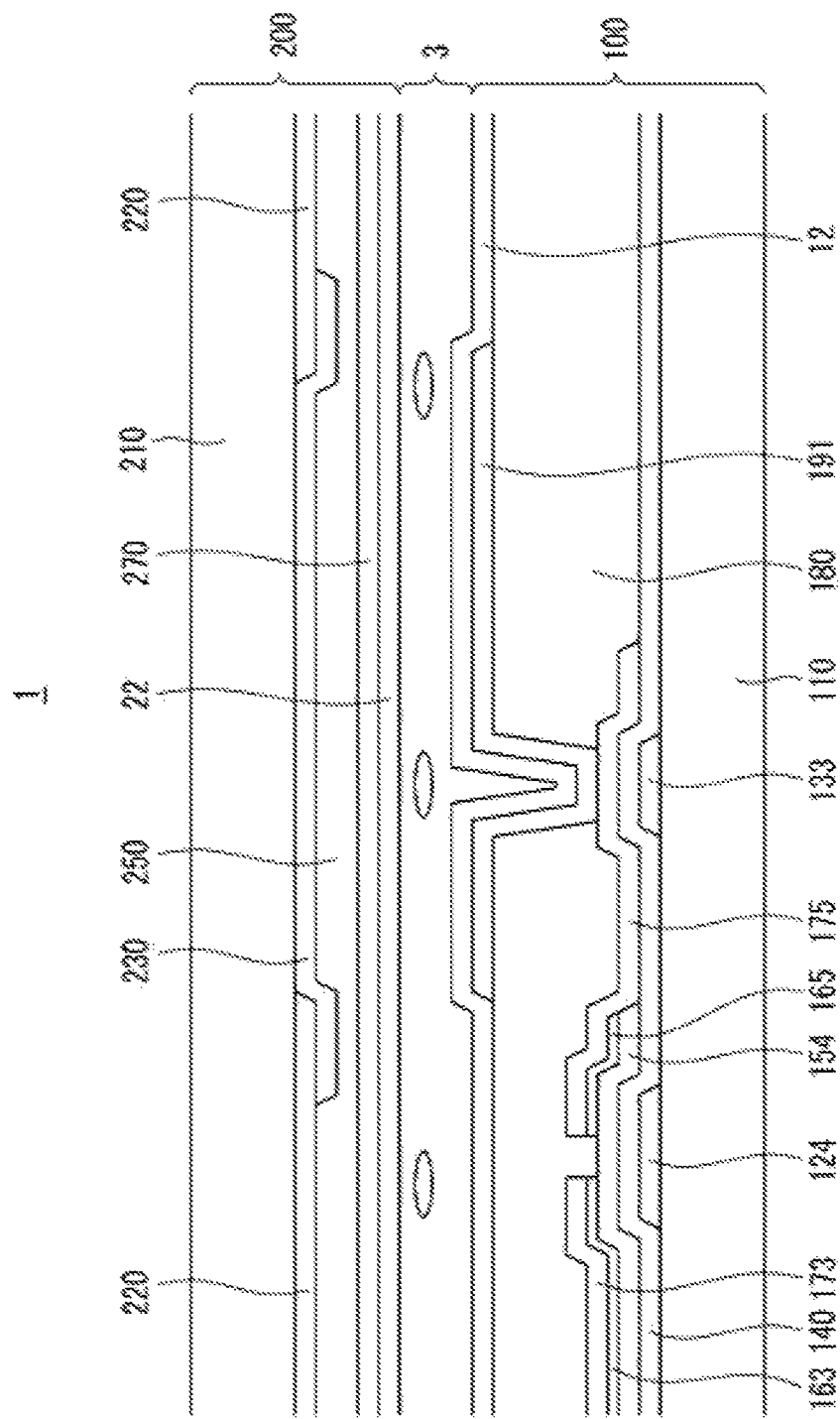

LIQUID CRYSTAL ALIGNMENT AGENT, LIQUID CRYSTAL ALIGNMENT FILM MANUFACTURED USING THE SAME, AND LIQUID CRYSTAL DISPLAY DEVICE INCLUDING THE LIQUID CRYSTAL ALIGNMENT FILM

CROSS-REFERENCE TO RELATED APPLICATION

This application claims priority under 35 USC Section 119 to and the benefit of Korean Patent Application No. 10-2010-0137872 filed on Dec. 29, 2010 and Korean Patent Application No. 10-2011-0063966 filed on Jun. 29, 2011 in the Korean Intellectual Property Office, the entire disclosures of which are incorporated herein by reference.

FIELD OF THE INVENTION

The present invention relates to a liquid crystal alignment agent, liquid crystal alignment film manufactured using the same, and a liquid crystal display including the liquid crystal alignment film.

BACKGROUND OF THE INVENTION

A liquid crystal display (LCD) includes a liquid crystal alignment film, and the liquid crystal alignment film is mainly made of polymer materials. The liquid crystal alignment film plays a role of a director in aligning liquid crystal molecules. When the liquid crystal molecules are moved by the influence of an electric field to display an image, the liquid crystal alignment film allows the liquid crystal molecules to be oriented in a predetermined direction. Generally, it is necessary to uniformly align the liquid crystal molecules in order to provide uniform brightness and a high contrast ratio to the LCD.

The conventional method of aligning the liquid crystal includes coating a polymer membrane such as a polyimide on a substrate made of a material such as glass, and rubbing the surface of the substrate with a fiber such as nylon or polyester in a certain direction. However, the rubbing method may cause serious problems while fabricating a liquid crystal panel due to fine dust or electrostatic discharge (ESD) that may be generated while rubbing the polymer membrane with the fiber.

In order to solve the problems of the rubbing method, a photo-radiation method has recently been researched to induce anisotropy to the polymer membrane by irradiating light on the membrane so as to align the liquid crystal molecules.

Polymers having diamine derived functional groups and photo-functional groups such as azobenzene, cumarine, chalcone, and cinnamate have been used as polymer membrane materials for photo-alignment methods. Such polymers are anisotropically photo-isomerized or photo-cross-linked when irradiated with polarized light, so as to provide anisotropy to the surface so that it can induce the liquid crystal molecules to align in a certain direction. The process of fabricating the diamine containing the photo-functional group, however, can be very complicated and thus is typically not cost effective.

SUMMARY OF THE INVENTION

One embodiment of the present invention provides a liquid crystal alignment agent which can be photo-aligned using a small amount of energy and which can provide excellent texture, excellent vertical alignment properties, chemical resistance, stable liquid crystal alignment properties, ease of liquid crystal dripping, excellent adherence to a substrate, electro-optical characteristics, excellent reliability to the after-image, and excellent processibility.

Another embodiment of the present invention provides a liquid crystal alignment film manufactured using the liquid crystal alignment agent.

Yet another embodiment of the present invention provides a liquid crystal display including the liquid crystal alignment film.

According to one embodiment of the present invention, a liquid crystal alignment agent is provided that includes a polymer comprising polyamic acid including a repeating unit represented by the following Chemical Formula 1, polyimide including a repeating unit represented by the following Chemical Formula 2, or a combination thereof.

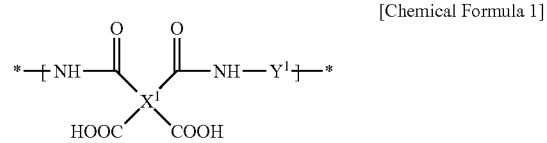

[Chemical Formula 1]

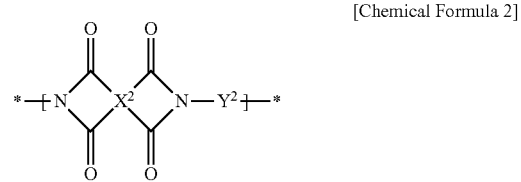

[Chemical Formula 2]

In Chemical Formulae 1 and 2, $X^1$ and $X^2$ are the same or different and are each independently a tetravalent organic group derived from alicyclic acid dianhydride or aromatic acid dianhydride, $Y^1$ and $Y^2$ are the same or different and are each independently a divalent organic group derived from diamine, wherein the diamine includes about 35 to about 90 mol % of diamine represented by the following Chemical Formula 3, about 5 to about 20 mol % of diamine represented by the following Chemical Formula 4, and about 5 to about 45 mol % of diamine represented by the following Chemical Formula 5.

[Chemical Formula 3]

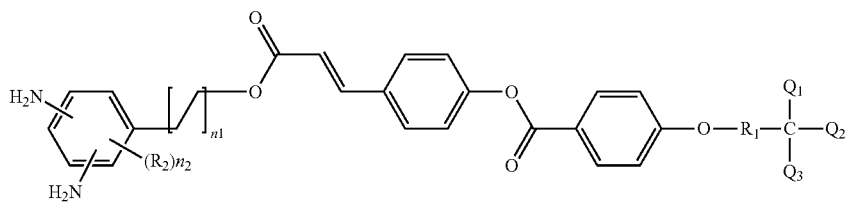

In Chemical Formula 3, $R_1$ is a single bond, substituted or unsubstituted C1 to C30 alkylene, or C1 to C30 alkylene wherein at least one —$CH_2$— group thereof is substituted with —CO—, —CO—O—, —NZ—, —NZ—CO—, —CO—NZ— or —CH=CH—, wherein Z is hydrogen or C1 to C10 alkyl, with the proviso that O in $R_1$ does not form —O—O— bonding within $R_1$ and with O adjacent to $R_1$, each $R_2$ is the same or different and is independently a substituted or unsubstituted aliphatic organic group, a substituted or unsubstituted alicyclic organic group, or a substituted or unsubstituted aromatic organic group, $Q_1$, $Q_2$ and $Q_3$ are the same or different and are each independently hydrogen or halogen, n1 is an integer ranging from 0 to 3, and n2 is an integer ranging from 0 to 3.

[Chemical Formula 4]

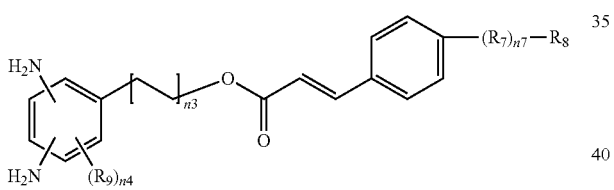

In Chemical Formula 4, each $R_7$ is independently a single bond, O, COO, NHCO, or CONH, n3 is an integer ranging from 0 to 3, n4 is an integer ranging from 0 to 3, n7 is an integer ranging from 0 to 2, $R_8$ is substituted or unsubstituted C1 to C30 alkyl, substituted or unsubstituted C6 to C30 aryl, substituted or unsubstituted C2 to C30 heteroaryl, C1 to C30 alkyl including —O—, —COO—, —CONH—, —COO—, or a combination thereof, C6 to C30 aryl including —O—, —COO—, —CONH—, —COO—, or a combination thereof, or C2 to C30 heteroaryl including —O—, —COO—, —CONH—, —COO—, or a combination thereof, and each $R_9$ is the same or different and is independently a substituted or unsubstituted aliphatic organic group, a substituted or unsubstituted alicyclic organic group, or a substituted or unsubstituted aromatic organic group.

[Chemical Formula 5]

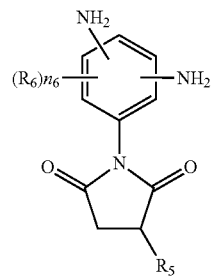

In Chemical Formula 5, $R_5$ is hydrogen; substituted or unsubstituted C1 to C30 alkyl; substituted or unsubstituted C6 to C30 aryl; or substituted or unsubstituted C2 to C30 heteroaryl, each $R_6$ is the same or different and is independently substituted or unsubstituted C1 to C30 alkyl; substituted or unsubstituted C6 to C30 aryl; or substituted or unsubstituted C2 to C30 heteroaryl, and n6 is an integer ranging from 0 to 3.

The diamine represented by Chemical Formula 3 may be a diamine represented by the following Chemical Formula 16.

[Chemical Formula 16]

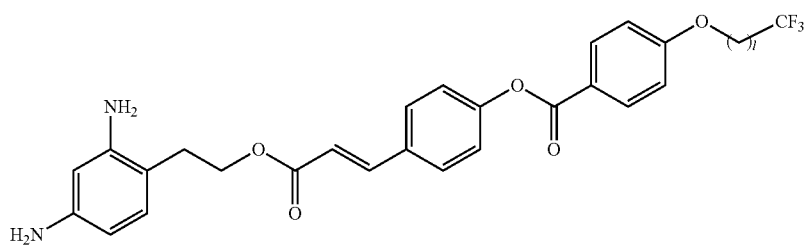

In Chemical Formula 16, l is an integer ranging from 0 to 10.

The diamine represented by Chemical Formula 4 may be a diamine represented by the following Chemical Formula 17.

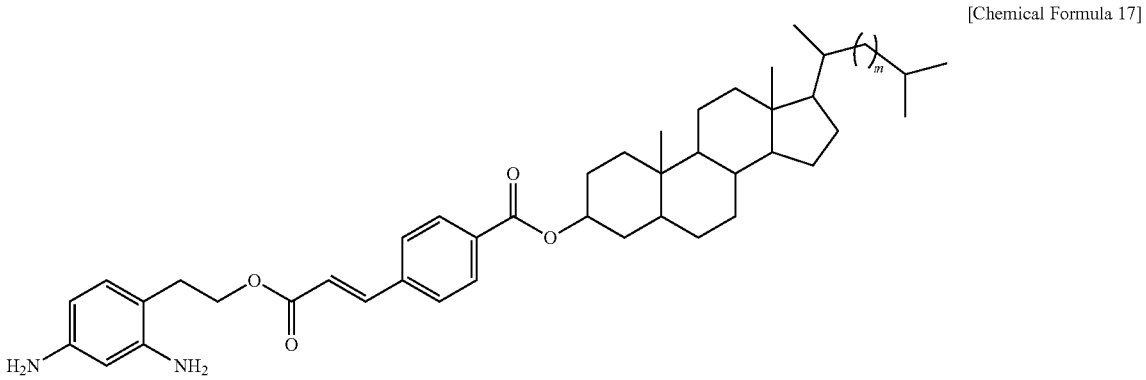

[Chemical Formula 17]

In Chemical Formula 17, m is an integer ranging from 1 to 5.

The polyamic acid and the polyimide each may have a weight average molecular weight of about 50,000 to about 500,000.

The liquid crystal alignment agent may include the polyamic acid and the polyimide at a weight ratio of about 1:99 to about 50:50.

The liquid crystal alignment agent may have a solid content of about 1 to about 30 wt %.

The liquid crystal alignment agent may have a viscosity of about 5 to about 30 cps.

According to another embodiment of the present invention, a liquid crystal alignment film manufactured by applying the liquid crystal alignment agent to a substrate is provided.

According to yet another embodiment of the present invention, a liquid crystal display (LCD) including the liquid crystal alignment film is provided.

The liquid crystal alignment agent may be photo-aligned at small energies and can provide excellent texture.

BRIEF DESCRIPTION OF THE DRAWING

FIG. 1 is a cross-sectional view of a liquid crystal display according to one embodiment of the present invention.

DETAILED DESCRIPTION

The present invention will be described more fully hereinafter in the following detailed description of the invention, in which some but not all embodiments of the invention are described. Indeed, this invention may be embodied in many different forms and should not be construed as limited to the embodiments set forth herein; rather, these embodiments are provided so that this disclosure will satisfy applicable legal requirements.

As used herein, when a specific definition is not otherwise provided, the term "substituted" may refer to one substituted with a substituent comprising halogen (F, Br, Cl or I), hydroxy, nitro, cyano, amino ($NH_2$, $NH(R^{100})$ or $N(R^{101})$ ($R^{102}$), wherein $R^{100}$, $R^{101}$ and $R^{102}$ are the same or different and are each independently C1 to C10 alkyl), amidino, hydrazine, hydrazone, carboxyl, substituted or unsubstituted alkyl, substituted or unsubstituted haloalkyl, substituted or unsubstituted alkoxy, substituted or unsubstituted alicyclic organic group, substituted or unsubstituted aryl, substituted or unsubstituted alkenyl, substituted or unsubstituted alkynyl, substituted or unsubstituted heteroaryl, substituted or unsubstituted heterocycloalkyl, or a combination thereof, in place of at least one hydrogen of a functional group.

As used herein, when a specific definition is not otherwise provided, the term "alkyl" may refer to C1 to C30 alkyl, for example C1 to C20 alkyl, the term "cycloalkyl" may refer to C3 to C30 cycloalkyl, for example C3 to C20 cycloalkyl, the term "heterocycloalkyl" may refer to C2 to C30 heterocycloalkyl, for example C2 to C20 heterocycloalkyl, the term "alkylene" may refer to C1 to C30 alkylene, for example C1 to C20 alkylene, the term "alkoxy" may refer to C1 to C30 alkoxy, for example C1 to C20 alkoxy, the term "cycloalkylene" may refer to C3 to C30 cycloalkylene, for example C3 to C20 cycloalkylene, the term "heterocycloalkylene" may refer to C2 to C30 heterocycloalkylene, for example C2 to C20 heterocycloalkylene, the term "aryl" may refer to C6 to C30 aryl, for example C6 to C20 aryl, the term "heteroaryl" may refer to C2 to C30 heteroaryl, for example C2 to C18 heteroaryl, the term "arylene" may refer to C6 to C30 arylene, for example C6 to C20 arylene, the term "heteroarylene" may refer to C2 to C30 heteroarylene, for example C2 to C20 heteroarylene, the term "alkylaryl" may refer to C7 to C30 alkylaryl, for example C7 to C20 alkylaryl, and the term "halogen" may refer to F, Cl, Br or I.

As used herein, when a specific definition is not otherwise provided, the terms heterocycloalkyl, heterocycloalkylene, heteroaryl, and heteroarylene may refer to cycloalkyl, cycloalkylene, aryl, and arylene, respectively, including one to three hetero atoms comprising N, O, S, P, or a combination thereof in place of one or more carbon ring atoms.

As used herein, when a specific definition is not otherwise provided, the term "aliphatic group" may refer to C1 to C30 alkyl, C2 to C30 alkenyl, C2 to C30 alkynyl, C1 to C30 alkylene, C2 to C30 alkenylene, or C2 to C30 alkynylene, for example C1 to C20 alkyl, C2 to C20 alkenyl, C2 to C20 alkynyl, C1 to C20 alkylene, C2 to C20 alkenylene, or C2 to C20 alkynylene, the term "alicyclic group" may refer to C3 to C30 cycloalkyl, C3 to C30 cycloalkenyl, C3 to C30 cycloalkynyl, C3 to C30 cycloalkylene, C3 to C30 cycloalkenylene, or C3 to C30 cycloalkynylene, for example C3 to C20 cycloalkyl, C3 to C20 cycloalkenyl, C3 to C20 cycloalkynyl, C3 to C20 cycloalkylene, C3 to C20 cycloalkenylene, or C3 to C20 cycloalkynylene, and the term "aromatic group" may refer to C6 to C30 aryl, C2 to C30 heteroaryl, C6 to C30 arylene, or C2 to C30 heteroarylene, for example C6 to C16 aryl, C2 to C16 heteroaryl, C6 to C16 arylene, or C2 to C16 heteroarylene.

As used herein, when a specific definition is not otherwise provided, the term "combination" may refer to a mixture or a copolymer, or may refer to, in an alicyclic organic group and an aromatic organic group, a fused ring formed by at least two cyclic groups, or two or more cyclic groups linked by a single bond, O, S, C(=O), CH(OH), S(=O), S(=O)$_2$, Si(CH$_3$)$_2$, (CH$_2$)$_p$ (wherein, $1 \leq p \leq 2$), (CF$_2$)$_q$ (wherein, $1 \leq q \leq 2$), C(CH$_3$)$_2$, C(CF$_3$)$_2$, C(CH$_3$)(CF$_3$), or C(=O)NH. The term "copolymerization" may refer to a block copolymerization or a random copolymerization, and the term "copolymer" may refer to a block copolymer or random copolymer.

In this specification "*" may refer to a portion where the same or different atoms or Chemical Formulae are linked to each other.

The liquid crystal alignment agent according to one embodiment includes a polymer comprising polyamic acid including a repeating unit represented by the following Chemical Formula 1, polyimide including a repeating unit represented by the following Chemical Formula 2, or a combination thereof.

[Chemical Formula 1]

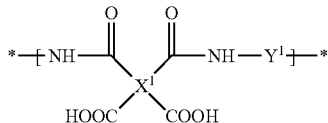

[Chemical Formula 2]

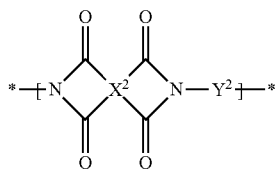

In Chemical Formulae 1 and 2, $X^1$ and $X^2$ are the same or different and are each independently a tetravalent organic group derived from alicyclic acid dianhydride or aromatic acid dianhydride. The $X^1$ may be the same or different in each repeating unit, and the $X^2$ may be the same or different in each repeating unit.

$Y^1$ and $Y^2$ are the same or different and are each independently a divalent organic group derived from diamine, wherein the diamine includes about 35 to about 90 mol % of diamine represented by the following Chemical Formula 3, about 5 to about 20 mol % of diamine represented by the following Chemical Formula 4, and about 5 to about 45 mol % of diamine represented by the following Chemical Formula 5.

In Chemical Formula 3, $R_1$ is a single bond, substituted or unsubstituted C1 to C30 alkylene, or C1 to C30 alkylene wherein at least one —CH$_2$— group thereof is substituted with —CO—, —CO—O—, —NW—, —NWCO—, —CO—NW— or —CH=CH—, wherein W is hydrogen or C1 to C10 alkyl, with the proviso that O in $R_1$ does not form —O—O— bonding within $R_1$ and with O adjacent to $R_1$, each $R_2$ is the same or different and is independently a substituted or unsubstituted aliphatic organic group, a substituted or unsubstituted alicyclic organic group, or a substituted or unsubstituted aromatic organic group, $Q_1$, $Q_2$ and $Q_3$ are the same or different and are each independently hydrogen or halogen, n1 is an integer ranging from 0 to 3, and n2 is an integer ranging from 0 to 3.

[Chemical Formula 4]

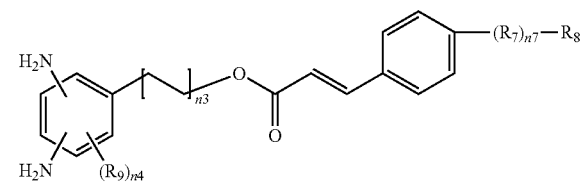

In Chemical Formula 4, each $R_7$ is independently a single bond, O, COO, NHCO, or CONH, n3 is an integer ranging from 0 to 3, n4 is an integer ranging from 0 to 3, n7 is an integer ranging from 0 to 2, $R_8$ is substituted or unsubstituted C1 to C30 alkyl, substituted or unsubstituted C6 to C30 aryl, substituted or unsubstituted C2 to C30 heteroaryl, C1 to C30 alkyl including —O—, —COO—, —CONH—, —COO—, or a combination thereof, C6 to C30 aryl including —O—, —COO—, —CONH—, —COO—, or a combination thereof, or C2 to C30 heteroaryl including —O—, —COO—, —CONH—, —COO—, or a combination thereof, and each $R_9$ is the same or different and is independently a substituted or unsubstituted aliphatic organic group, a substituted or unsubstituted alicyclic organic group, or a substituted or unsubstituted aromatic organic group.

[Chemical Formula 3]

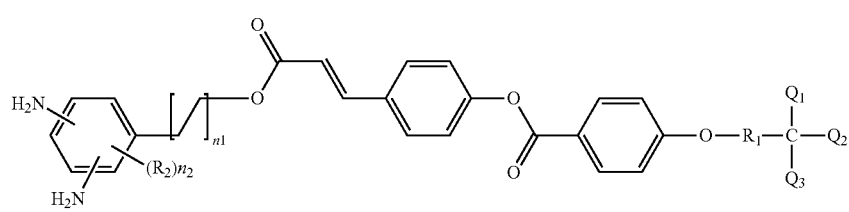

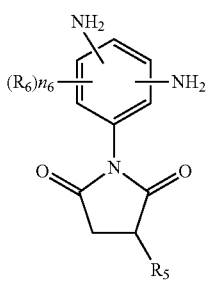

[Chemical Formula 5]

In Chemical Formula 5, $R_5$ is hydrogen; substituted or unsubstituted C1 to C30 alkyl; substituted or unsubstituted C6 to C30 aryl; or substituted or unsubstituted C2 to C30 heteroaryl, each $R_6$ is the same or different and is independently substituted or unsubstituted C1 to C30 alkyl; substituted or unsubstituted C6 to C30 aryl; or substituted or unsubstituted C2 to C30 heteroaryl, and $n_6$ is an integer ranging from 0 to 3.

Examples of the diamine represented by Chemical Formula 3 include the compound represented by the following Chemical Formula 16, but are not limited thereto.

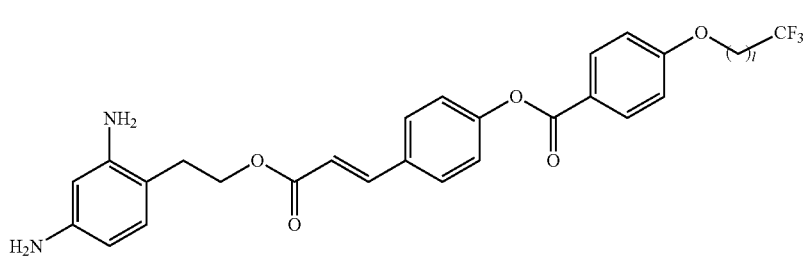

[Chemical Formula 16]

In Chemical Formula 16, l is an integer ranging from 0 to 10.

Examples of the diamine represented by Chemical Formula 4 include the compound represented by the following Chemical Formula 17, but are not limited thereto.

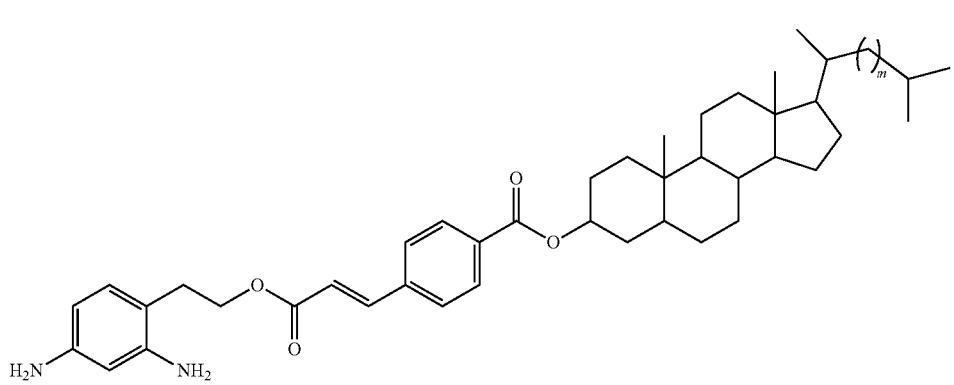

[Chemical Formula 17]

In Chemical Formula 17, m is an integer ranging from 1 to 3.

The diamines of Chemical Formula 3, Chemical Formula 4, and/or Chemical Formula 5 may be commercially available and/or may be synthesized by the skilled artisan without undue experimentation. Suitable starting materials for the synthesis of the diamines can also be commercially available and/or can be readily synthesized by the skilled artisan. The specification including the examples below illustrates non-limiting exemplary diamines of Chemical Formula 3, Chemical Formula 4, and/or Chemical Formula 5. The skilled artisan will understand and appreciate the types of, and how to make, the diamines of Chemical Formula 3, Chemical Formula 4, and/or Chemical Formula 5, including the selection of suitable starting materials and reaction conditions, without undue experimentation.

In some embodiments, the diamine may include the diamine represented by Chemical Formula 3 in an amount of about 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 mol %. Further, according to some embodiments of the present invention, the amount of the diamine represented by Chemical Formula 3 can be in a range from about any of the foregoing amounts to about any other of the foregoing amounts.

In some embodiments, the diamine may include the diamine represented by Chemical Formula 4 in an amount of about 5, 6, 7, 8, 9, 10, 11, 12, 13, 14, 15, 16, 17, 18, 19, or 20 mol %. Further, according to some embodiments of the present invention, the amount of the diamine represented by Chemical Formula 4 can be in a range from about any of the foregoing amounts to about any other of the foregoing amounts.

In some embodiments, the diamine may include the diamine represented by Chemical Formula 5 in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, or 45 mol %. Further, according to some embodiments of the present invention, the amount of the diamine represented by Chemical Formula 5 can be in a range from about any of the foregoing amounts to about any other of the foregoing amounts.

When the diamine includes about 35 to about 90 mol % of diamine represented by Chemical Formula 3, about 5 to about 20 mol of diamine represented by Chemical Formula 4, and about 5 to about 45 mol % of diamine represented by Chemical Formula 5, it may optimize the liquid crystal alignment properties and provide an excellent after-image.

The polymer may be photo-aligned when the diamine derived from Chemical Formula 3 is added. Adding the diamine derived from Chemical Formula 4 and the diamine derived from Chemical Formula 5 may enhance the vertical alignment property, and further the polymer may be photo-aligned using a small energy level and may exhibit excellent texture.

The liquid crystal alignment agent may further include a solvent and one or more other additives in addition to the polymer. Hereinafter, the components are described in detail.

Polymer

The polymer is a photo-polymer including polyamic acid including a repeating unit represented by Chemical Formula 1, polyimide including a repeating unit represented by Chemical Formula 2, or a combination thereof.

The polymers carry out reactions such as photo-isomerization, photo-cross linking and the like in an anisotropic manner. Thereby, anisotropy occurs on the polymer surface to induce the molecular alignment of liquid crystal in one direction.

The polyamic acid including a repeating unit represented by Chemical Formula 1 may be synthesized from acid dianhydride, the diamine represented by Chemical Formula 3, the diamine represented by Chemical Formula 4, and the diamine represented by Chemical Formula 5. The method of preparing a polyamic acid by copolymerizing the acid dianhydride and the diamine represented by Chemical Formula 3, the diamine represented by Chemical Formula 4, and the diamine represented by Chemical Formula 5 may include any conventional methods known for synthesizing polyamic acid.

In addition, the polyimide including a repeating unit represented by Chemical Formula 2 may be synthesized from acid dianhydride, the diamine represented by Chemical Formula 3, the diamine represented by Chemical Formula 4, and the diamine represented by Chemical Formula 5. The method of copolymerizing and imidizing the acid dianhydride and the diamine represented by Chemical Formula 3, the diamine represented by Chemical Formula 4, and the diamine represented by Chemical Formula 5 to provide a polyimide is well known in the art.

Examples of the acid dianhydride may include without limitation alicyclic acid dianhydride, aromatic acid dianhydride, and the like and mixtures thereof.

Examples of the alicyclic acid dianhydride may include without limitation 1,2,3,4-cyclobutanetetracarboxylic acid dianhydride (CBDA), 5-(2,5-dioxotetrahydrofuryl)-3-methylcyclohexene-1,2-dicarboxylic acid anhydride (DOCDA), bicyclooctene-2,3,5,6-tetracarboxylic acid dianhydride (BODA), 1,2,3,4-cyclopentanetetracarboxylic acid dianhydride (CPDA), 1,2,4,5-cyclohexanetetracarboxylic acid dianhydride (CHDA), 1,2,4-tricarboxyl-3-methylcarboxyl cyclopentane dianhydride, 1,2,3,4-tetracarboxyl cyclopentane dianhydride, 4,10-dioxa-tricyclo[6.3.1.0$^{2,7}$]dodecane-3,5,9,11-tetraone, and the like, and mixtures thereof.

Examples of the aromatic acid dianhydride may include without limitation pyromellitic dianhydride (PMDA), biphthalic dianhydride (BPDA), oxydiphthalic dianhydride (ODPA), benzophenonetetracarboxylic dianhydride (BTDA), hexafluoroisopropylidene diphthalic dianhydride (6-FDA), and the like, and mixtures thereof.

The polyamic acid and the polyimide each may have a weight average molecular weight of about 50,000 to about 500,000. A polyamic acid and polyimide with a weight average molecular weight within the above range can exhibit improved solubility, thermal stability, and chemical resistance and can maintain an appropriate viscosity to provide excellent printability and an uniform layer with minimal or no difficulty.

When the liquid crystal alignment agent includes both the polyamic acid and the polyimide, the liquid crystal alignment agent may include the polyamic acid and the polyimide in a weight ratio of about 1:99 to about 50:50, for example a weight ratio of about 10:90 to about 50:50. In some embodiments, the combination of the polyamic acid and the polyimide may include the polyamic acid in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments of the present invention, the amount of the polyamic acid can be in a range from about any of the foregoing amounts to about any other of the foregoing amounts.

In some embodiments, the combination of the polyamic acid and the polyimide may include the polyimide in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 wt %. Further, according to some embodiments of the present invention, the amount of the polyimide can be in a range from about any of the foregoing amounts to about any other of the foregoing amounts.

Including the polyamic acid and the polyimide in a weight ratio within the above range may improve alignment stability.

The liquid crystal alignment agent may include the polymer in an amount of about 1 wt % to about 30 wt %, for example about 3 wt % to about 20 wt %, based on the total weight of the liquid crystal alignment agent. In some embodiments, the liquid crystal alignment agent may include the polymer in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 wt %. Further, according to some embodiments of the present invention, the amount of the polymer can be in a range from about any of the foregoing amounts to about any other of the foregoing amounts.

When the polymer is included in an amount within the above range, it may improve printability and liquid crystal alignment properties.

Solvent

The liquid crystal alignment agent may include an appropriate solvent for dissolving the polymer. In this manner, the liquid crystal alignment agent may have excellent spreadability and excellent adhesion to a substrate.

Examples of the solvent suitable for dissolving the polymer may include without limitation N-methyl-2-pyrrolidone; N,N-dimethyl acetamide; N,N-dimethyl formamide; dimethyl sulfoxide; γ-butyrolactone; tetrahydrofuran (THF); and phenol-based solvents such as meta cresol, phenol, halogenated phenols, and the like, and combinations thereof.

The solvent may further include 2-butyl cellosolve (2-BC), which can improve printability. The 2-butyl cellosolve may be included in an amount of about 1 to about 70 wt %, for example, about 20 to about 60 wt %, based on the total amount of solvent including 2-butyl cellosolve. When the 2-butyl cellosolve is included in an amount within the above range, it may easily improve printability.

In addition, the solvent may further include a poor solvent. Examples of poor solvents include without limitation alcohols, ketones, esters, ethers, hydrocarbons, halogenated hydrocarbons, and the like, and combinations thereof. The poor solvent can be present in an appropriate ratio as long as the soluble polyimide polymer is not deposited. The poor solvent may lower surface energy of a liquid crystal alignment agent to improve spreadability and flatness when the liquid crystal alignment agent is coated onto a substrate.

The liquid crystal alignment agent can include the poor solvent in an amount of about 1 to about 90 wt %, for example about 1 to about 70 wt %, based on the total amount of the solvent including poor solvent.

Examples of the poor solvent may include without limitation methanol, ethanol, isopropanol, cyclohexanol, ethylene glycol, propylene glycol, 1,4-butanediol, triethylene glycol, acetone, methylethylketone, cyclohexanone, methylacetate, ethylacetate, butylacetate, diethyloxalate, malonic acid ester, diethylether, ethyleneglycol monomethylether, ethyleneglycol dimethylether, ethyleneglycol monoethylether, ethylene glycol phenylether, ethylene glycol phenylmethylether, ethylene glycol phenylethylether, diethylene glycol dimethylether, diethylene glycol ether, diethylene glycol monomethylether, diethylene glycol monoethylether, diethylene glycol monomethylether acetate, diethylene glycol monoethylether acetate, ethylene glycol methylether acetate, ethylene glycol ethylether acetate, 4-hydroxy-4-methyl-2-pentanone, 2-hydroxy ethyl propionate, 2-hydroxy-2-methyl ethyl propionate, ethoxy ethyl acetate, hydroxy ethyl acetate, 2-hydroxy-3-methyl methyl butanoate, 3-methoxy methyl propionate, 3-methoxy ethyl propionate, 3-ethoxy ethyl propionate, 3-ethoxy methyl propionate, methyl methoxy butanol, ethyl methoxy butanol, methyl ethoxy butanol, ethyl ethoxy butanol, tetrahydrofuran, dichloromethane, 1,2-dichloroethane, 1,4-dichloro butane, trichloro ethane, chlorobenzene, o-dichlorobenzene, hexane, heptane, octane, benzene, toluene, xylene, and the like, and mixtures thereof.

The amount of solvent is not limited in the liquid crystal alignment agent, but the solid content of the liquid crystal alignment agent ranges from about 1 to about 30 wt %, for example about 3 to about 20 wt %. In some embodiments, the solid content in the liquid crystal alignment agent may be in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 wt %. Further, according to some embodiments of the present invention, the solid content can be in a range from about any of the foregoing amounts to about any other of the foregoing amounts.

When the solid content is within the above range, the liquid crystal alignment agent may be less affected by impurities on a substrate surface during printing and may maintain appropriate layer uniformity and appropriate viscosity. This may prevent deterioration of layer uniformity due to high viscosity during the printing process and may provide an appropriate transmittance.

The liquid crystal alignment agent may have a viscosity of about 5 to about 30 cps, for example, a viscosity of about 10 to about 20 cps. When the liquid crystal alignment agent has a viscosity within the above range, it may improve coating uniformity and coating properties.

Other Additives

The liquid crystal alignment agent according to one embodiment may further include one or more other additives.

The other additives may include an epoxy compound. The epoxy compound can improve the reliability and the electro-optical characteristics. The epoxy compound may include at least one kind of epoxy compound having 2 to 8 epoxy groups, for example, 2 to 4 epoxy groups.

The liquid crystal alignment agent may include the epoxy compound in an amount of about 0.1 to about 50 parts by weight, for example, about 1 to about 30 parts by weight, based on about 100 parts by weight of the polymer. When the epoxy compound is included in an amount within the above range, it may provide an appropriate printability and flatness during coating on the substrate, and it may easily improve the reliability and the electro-optical characteristics.

Examples of epoxy compound may include the compounds represented by the following Chemical Formula 18, but is not limited thereto.

[Chemical Formula 18]

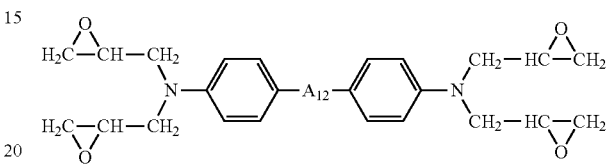

In Chemical Formula 18, $A_{12}$ is a substituted or unsubstituted C6 to C12 aromatic organic group, a substituted or unsubstituted divalent C6 to C12 alicyclic organic group, or a substituted or unsubstituted divalent C6 to C12 aliphatic organic group, for example substituted or unsubstituted C1 to C6 alkylene.

Examples of the epoxy compound may include without limitation N,N,N',N'-tetraglycidyl-4,4'-diaminophenylmethane (TGDDM), N,N,N',N'-tetraglycidyl-4,4'-diaminophenylethane, N,N,N',N'-tetraglycidyl-4,4'-diaminophenylpropane, N,N,N',N'-tetraglycidyl-4,4'-diaminophenylbutane, N,N,N',N'-tetraglycidyl-4,4'-diaminobenzene, ethyleneglycoldiglycidylether, polyethyleneglycoldiglycidylether, propyleneglycoldiglycidylether, tripropyleneglycoldiglycidylether, polypropyleneglycoldiglycidylether, neopentylglycoldiglycidylether, 1,6-hexanedioldiglycidylether, glycerinediglycidylether, 2,2-dibromoneopentylglycoldiglycidylether, 1,3,5,6-tetraglycidyl-2,4-hexanediol, N,N,N',N'-tetraglycidyl-1,4-phenylenediamine, N,N,N',N'-tetraglycidyl-m-xylenediamine, N,N,N',N'-tetraglycidyl-2,2'-dimethyl-4,4'-diaminobiphenyl, 2,2-bis[4-(N,N-diglycidyl-4-aminophenoxy)phenyl]propane, N,N,N',N'-tetraglycidyl-4,4'-diaminodiphenylmethane, 1,3-bis(N,N-diglycidylaminomethyl)cyclohexane, 1,3-bis(N,N-diglycidylaminomethyl)benzene, and the like, and combinations thereof.

In addition, in order to improve printability, the liquid crystal alignment agent may further include an appropriate surfactant, a coupling agent, or a combination thereof.

A liquid crystal alignment film may be obtained by using the liquid crystal alignment agent.

The liquid crystal alignment film may be fabricated by coating the liquid crystal alignment agent that is dissolved in the organic solvent on a substrate. The liquid crystal alignment agent may be coated on the substrate according to a method such as but not limited to spin coating, flexo printing, inkjet printing and the like. The flexo printing can accomplish excellent uniformity of a film and may easily form a larger liquid crystal alignment film.

The substrate is not particularly limited, as long as it is transparent. Examples of the substrate include but are not limited to glass substrates and plastic substrates such as acrylic substrates, polycarbonate substrates, and the like. In addition, the substrate may include an indium-tin oxide (ITO) electrode and the like for liquid crystal operation to simplify manufacturing processes.

In order to improve uniformity of a film, the liquid crystal alignment agent may be uniformly coated on a substrate and pre-dried at a temperature ranging from room temperature to about 200° C., for example about 30 to about 150° C., and as another example about 40 to about 120° C., for about 1 to about 100 minutes. The pre-drying can control the volatilization of each component of the liquid crystal alignment agent to provide a uniform film with minimal or no thickness deviation.

Then, the coated substrate can be fired at a temperature of about 80 to about 300° C., for example about 120 to about 280° C., for about 5 to about 300 minutes to completely evaporate a solvent to provide a liquid crystal alignment film.

The liquid crystal alignment film can be used for a liquid crystal display with uniaxial alignment treatment by polarized ultraviolet (UV) rays or rubbing, or without the uniaxial alignment treatment for some uses such as a vertical alignment film and the like.

The liquid crystal alignment film according to one embodiment of the present invention may be subjected to uniaxial alignment treatment by exposing to light with energy of about 10 mJ to about 5000 mJ for about 0.1 to about 180 minutes.

According to a further embodiment of the present invention, a display device including the liquid crystal alignment film is provided.

The liquid crystal display device (LCD) can include a 90 degree-twisted liquid crystal between a polarizer and an analyzer having polarized directions perpendicular to each other. When voltage is not applied, the linear polarized light passing through a polarizer locally rotates according to the direction of other liquid crystal aligner to polarize in 90 degree. Accordingly, the light is rotated when passing through the liquid crystal layer and passed through the analyzer. When applying voltage, the liquid crystal is in a line in a direction parallel to the electric field direction, and the linearly polarized light is passed through the liquid crystal layer without rotating so blocked by the analyzer having a polarized direction perpendicular to the direction of polarizer. By controlling the liquid crystal as described above, it may selectively transmit light. Accordingly, it is very important to uniformly align the liquid crystal in the whole LCD panel in order to provide uniform brightness and high contrast ratio in the LCD. The liquid crystal alignment film may be used in this aspect.

In addition, for example, the liquid crystal display may be fabricated by coating an liquid crystal alignment agent on a glass substrate deposited with an indium tin oxide (ITO) conductive layer, thermally curing the same to provide an alignment film, assembling two substrates to face each other; and injecting liquid crystal; or dipping liquid crystal on one substrate, and assembling the same with the counter substrate.

FIG. 1 is a cross-sectional view showing a liquid crystal display. In FIG. 1, the reference numbers refer to the following:

| | |
|---|---|
| 1: liquid crystal display | 3: liquid crystal layer |
| 12: first liquid crystal alignment film | |
| 22: second liquid crystal alignment film | |
| 100: lower panel | 110: first substrate |
| 124: gate electrode | 133: storage electrode |
| 140: gate insulating layer | 154: semiconductor |
| 163, 165: ohmic contact | 173: source electrode |
| 175: drain electrode | 180: passivation layer |
| 191: pixel electrode | 200: upper panel |
| 210: the second substrate | 220: light blocking member |
| 230: color filter | 250: overcoat |
| 270: common electrode | |

As shown in FIG. 1, the liquid crystal display (LCD) 1 according to one embodiment of the present invention includes a lower panel 100, an upper panel 200, and a liquid crystal layer 3.

In the lower panel 100, a gate conductor including a plurality of gate lines (not shown) and a plurality of storage electrodes 133 is formed on a front surface of a first substrate 110. On the gate conductor, a gate insulating layer 140, a plurality of semiconductors 154, a plurality of pairs of ohmic contacts 163 and 165, a plurality of source electrodes 173, and a plurality of drain electrodes 175 are sequentially formed.

One thin film transistor (TFT) consists of one gate electrode 124, one source electrode 173, and one drain electrode 175 together with a semiconductor 154.

A passivation layer 180 is formed on the exposed portion of the semiconductor 154, the source electrode 173, the drain electrode 175, and the gate insulating layer 140. On the passivation layer 180, a plurality of pixel electrodes 191 are formed.

Hereinafter, the upper panel 200 is described.

In the upper panel 200, a light blocking member 220 is formed on a second substrate 210. A plurality of color filters 230 is formed on the second substrate 210 and the light blocking member 220, and an overcoat 250 is formed on the color filter 230. The overcoat 250 is to prevent the color filter 230 from being exposed to the liquid crystal layer 3, and the overcoat 250 can be omitted.

A first liquid crystal alignment film 12 is formed on the surface of the pixel electrode 191 of the lower panel 100, and a second liquid crystal alignment film 22 is formed on the surface of a common electrode 270 of the upper panel 200. The first liquid crystal alignment film 12 and the second liquid crystal alignment film 22 are fabricated by using the liquid crystal alignment agent according to one embodiment of the present invention.

Even though the liquid crystal alignment films 12 and 22 are shown to be respectively formed on the lower panel 100 and the upper panel 200 in FIG. 1, the liquid crystal alignment film 12 or 22 may be formed in either the upper panel 200 or the lower panel 100.

The following examples illustrate the present invention in more detail. These examples, however, should not in any sense be interpreted as limiting the scope of the present invention.

EXAMPLE

Comparative Example 1

Preparation of Polyamic Acid

Under dark room conditions, 0.5 mol of 4-{2-[2-(2,4-diamino-phenyl)-ethoxycarbonyl]-vinyl}-phenyl 4-(4,4,4-trifluoro butoxy)-benzoate ester represented by the following Chemical Formula 3a is introduced into a four-necked flask with an agitator, a temperature controller, a nitrogen gas injector, and a cooler while passing nitrogen and added with N-methyl-2-pyrrolidone (NMP) to dissolve the compound represented by Chemical Formula 3a into NMP.

1.0 mol of the solid 4,10-dioxa-tricyclo[6.3.1.0$^{2,7}$]dodecane-3,5,9,11-tetraone (also referred to "2,3,5-tricarboxylcyclopentyl acetic anhydride") is introduced into the solution and vigorously agitated.

After agitating for one hour, 0.5 mol of 4-{2-[2-(2,4-diamino-phenyl)-ethoxycarbonyl]-vinyl}-phenyl 4-(4,4,4-trifluorobutoxy)-benzoate ester represented by the following Chemical Formula 3a is added into the agitation product and reacted to provide an appropriate viscosity (about 150 cps).

The obtained solution has a solid content of 30 wt %, and the solution is copolymerized for 24 hours while maintaining the temperature at 50° C. to provide a polyamic acid solution.

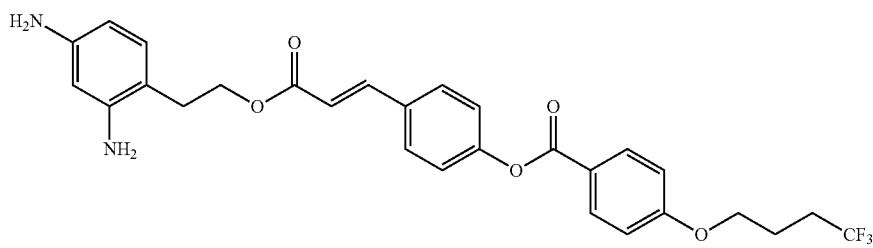

[Chemical Formula 3a]

The prepared polyamic acid has a weight average molecular weight of 200,000. An organic mixed solvent (3:4:3 volume ratio) of N-methyl-2-pyrrolidone (NMP), γ-butyrolactone, and 2-butyl cellusolve is added into the polyamic acid and agitated at a room temperature for 24 hours to provide a photo alignment polyamic acid (liquid crystal alignment agent) solution.

Example 1

Preparation of Polyamic Acid (PSA-1)

Under dark room conditions, 0.5 mol (first adding amount) of 4-{2-[2-(2,4-diamino-phenyl)-ethoxycarbonyl]-vinyl}-phenyl 4-(4,4,4-trifluorobutoxy)-benzoate ester represented by the following Chemical Formula 3a is introduced into a four-necked flask with an agitator, a temperature controller, a nitrogen gas injector, and a cooler while passing nitrogen and added with N-methyl-2-pyrrolidone (NMP) to dissolve the compound represented by Chemical Formula 3a into NMP.

1.0 mol of solid 4,10-dioxa-tricyclo[6.3.1.0$^{2,7}$]dodecane-3,5,9,11-tetraone (also referred to "2,3,5-tricarboxylcyclopentyl acetic anhydride") is introduced into the solution and vigorously agitated.

After agitating for one hour, 0.3 mol (second adding amount) of 4-{2-[2-(2,4-diamino-phenyl)-ethoxycarbonyl]-vinyl}-phenyl 4-(4,4,4-trifluorobutoxy)-benzoate ester represented by the following Chemical Formula 3a, 0.05 mol of ((E)-10,13-dimethyl-17-(6-methylheptan-2-yl)hexadecahydro-1H-cyclopenta[a]phenanthren-3-yl 4-(3-(2,4-diaminophenethoxy)-3-oxopropen-3-yl)benzoate represented by Chemical Formula 4a, and 0.15 mol of 1-(3,5-diaminophenyl)-3-octadecyl succinimide represented by Chemical Formula 5a are added into the agitated product and reacted to provide an appropriate viscosity (about 150 cps).

The obtained solution has a solid content of 30 wt %, and the solution is copolymerized for 24 hours while maintaining the temperature at 50° C. to provide a polyamic acid solution.

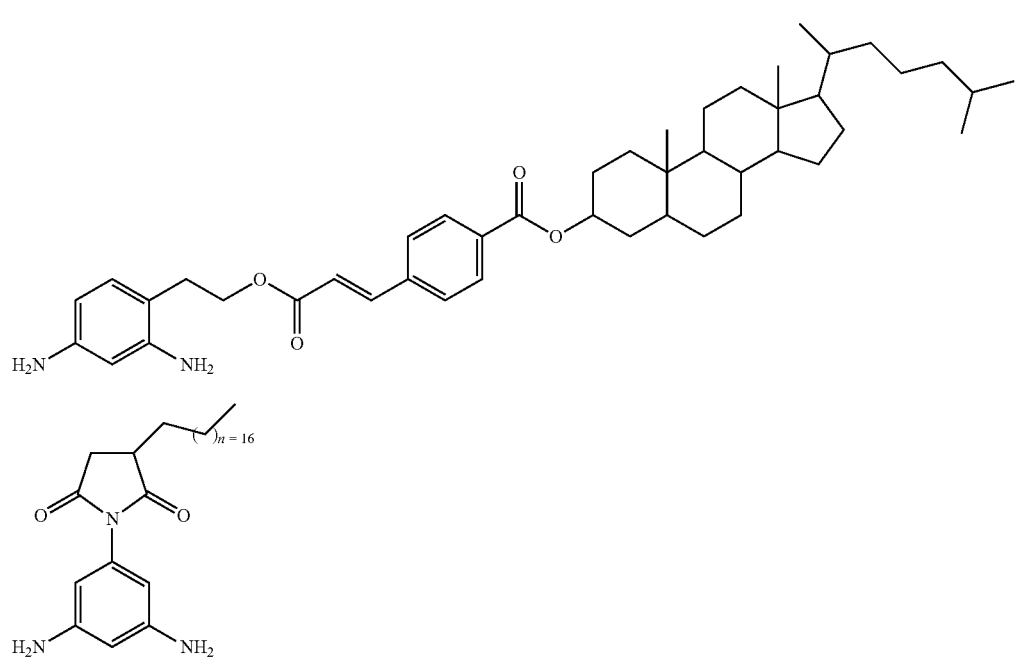

[Chemical Formula 4a]

[Chemical Formula 5a]

The obtained polyamic acid solution is distillated to provide a pure polyamic acid. The prepared polyamic acid has a weight average molecular weight of 200,000. An organic mixed solvent (3:4:3 volume ratio) of N-methyl-2-pyrrolidone (NMP), γ-butyrolactone, and 2-butyl cellusolve are added into the polyamic acid and agitated at a room temperature for 24 hours to provide a photo alignment polyamic acid (PSA-1, liquid crystal alignment agent) solution.

Example 2 to 10

Preparation of Polyamic Acid (PSA-2 to 10)

A photo aligning polyamic acid (PSA-2 to 10, liquid crystal alignment agent) solution is prepared in accordance with the same procedure as in Example 1, except that 4-{2-[2-(2,4-diamino-phenyl)-ethoxycarbonyl]-vinyl}-phenyl 4-(4,4,4-trifluoro butoxy)-benzoate ester represented by Chemical Formula 3a, (E)-10,13-dimethyl-17-(6-methylheptan-2-yl)hexadecahydro-1H-cyclopenta[a]phenanthren-3-yl 4-(3-(2,4-diaminophenethoxy)-3-oxopropen-3-yl)benzoate represented by Chemical Formula 4a, and 1-(3,5-diaminophenyl)-3-octadecyl succinimide represented by Chemical Formula 5a are added as shown in the following Table 1. In Table 1, the total amount of 4-{2-[2-(2,4-diamino-phenyl)-ethoxycarbonyl]-vinyl}-phenyl 4-(4,4,4-trifluorobutoxy)-benzoate ester represented by Chemical Formula 3a is calculated by adding the first and second amounts, and the first amount thereof is 0.5 mol in all Examples.

Comparative Example 2

Preparation of Polyimide Polymer

Under the dark room condition, 0.5 mol of 4-{2-[2-(2,4-diamino-phenyl)-ethoxycarbonyl]-vinyl}-phenyl 4-(4,4,4-trifluorobutoxy)-benzoate ester represented by the following Chemical Formula 3a is introduced into a four-necked flask with an agitator, a temperature controller, a nitrogen gas injector, and a cooler while passing nitrogen and added with N-methyl-2-pyrrolidone (NMP) to dissolve the compound represented by Chemical Formula 3a into NMP.

1.0 mol of the solid 4,10-dioxa-tricyclo[6.3.1.0$^{2,7}$]dodecane-3,5,9,11-tetraone (also referred to "2,3,5-tricarboxylcyclopentyl acetic anhydride") is introduced into the solution and vigorously agitated.

After agitating for one hour, 0.5 mol of 4-{2-[2-(2,4-diamino-phenyl)-ethoxycarbonyl]-vinyl}-phenyl 4-(4,4,4-trifluorobutoxy)-benzoate ester represented by the following Chemical Formula 3a is added and reacted to provide an appropriate viscosity (about 150 cps).

The obtained solution has a solid content of 30 wt %, and the solution is copolymerized for 24 hours at room temperature to provide a polyamic acid solution.

3.0 mol of acetic anhydride catalyst and 5.0 mol of pyridine catalyst are added into the polyamic acid solution and heated at 80° C. and reacted for 6 hours. Acetic anhydride and pyridine catalyst and NMP solvent are removed through vacuum distillation of the reaction product to provide a soluble polyimide resin solution having a solid content of 20 wt %.

The obtained soluble polyimide resin is distillated to provide a pure soluble polyimide resin (weight average molecular weight of 200,000). An organic mixed solvent (3:4:3 plume ratio) of N-methyl-2-pyrrolidone (NMP), γ-butyrolactone, and 2-butyl cellusolve is added into the soluble polyimide resin and agitated at a room temperature for 24 hours to provide a soluble photo aligning polyimide resin (PSI-1, liquid crystal alignment agent) solution.

Example 11

Preparation of Polyimide Polymer (PSI-2)

Under dark room conditions, 0.5 mol (first amount) of 4-{2-[2-(2,4-diamino-phenyl)-ethoxycarbonyl]-vinyl}-phenyl 4-(4,4,4-trifluorobutoxy)-benzoate ester represented by the following Chemical Formula 3a is introduced into a four-necked flask with an agitator, a temperature controller, a nitrogen gas injector, and a cooler while passing nitrogen and added with N-methyl-2-pyrrolidone (NMP) to dissolve the compound represented by Chemical Formula 3a into NMP.

1.0 mol of the solid 4,10-dioxa-tricyclo[6.3.1.0$^{2,7}$]dodecane-3,5,9,11-tetraone (also referred to "2,3,5-tricarboxylcyclopentyl acetic anhydride") is introduced into the solution and vigorously agitated.

After agitating for one hour, 0.4 mol (second amount) of 4-{2-[2-(2,4-diamino-phenyl)-ethoxycarbonyl]-vinyl}-phenyl 4-(4,4,4-trifluorobutoxy)-benzoate ester represented by the following Chemical Formula 3a, 0.05 mol of ((E)-10,13-dimethyl-17-(6-methylheptan-2-yl)hexadecahydro-1H-cyclopenta[a]phenanthren-3-yl 4-(3-(2,4-diaminophenethoxy)-3-oxopropen-3-yl)benzoate represented by Chemical Formula 4a, and 0.15 mol of 1-(3,5-diaminophenyl)-3-octadecyl succinimide represented by Chemical Formula 5a are added into the agitated product and reacted to provide an appropriate viscosity (about 150 cps).

The obtained solution has a solid content of 30 wt %, and the solution is copolymerized for 24 hours at a room temperature to provide a polyamic acid solution.

3.0 mol of acetic anhydride catalyst and 5.0 mol of pyridine catalyst are added into the polyamic acid solution and heated until 80° C. and reacted for 6 hours. Acetic anhydride and pyridine catalyst and NMP solvent are removed by vacuum distillation of reaction product to provide a soluble polyimide resin solution having a solid content of 20 wt %.

The obtained soluble polyimide resin is distillated to provide a pure soluble polyimide resin (weight average molecular weight of 200,000). An organic mixed solvent (3:4:3 volume ratio) of N-methyl-2-pyrrolidone (NMP), γ-butyrolactone, and 2-butyl cellusolve is added into the polyimide resin and agitated at a room temperature for 24 hours to provide a soluble photo aligning polyimide resin (PSI-1, liquid crystal alignment agent).

Example 12 to 20

Preparation of Polyimide Polymers (PSI-2 to PSI-10)

A soluble photo alignment polyimide resin solution (liquid crystal alignment agent) is prepared in accordance with the same procedure as in Example 11, except that 4-{2-[2-(2,4-diamino-phenyl)-ethoxycarbonyl]-vinyl}-phenyl 4-(4,4,4-trifluorobutoxy)-benzoate ester represented by Chemical Formula 3a, (E)-10,13-dimethyl-17-(6-methylheptan-2-yl)hexadecahydro-1H-cyclopenta[a]phenanthren-3-yl 4-(3-(2,4-diaminophenethoxy)-3-oxopropen-3-yl)benzoate represented by Chemical Formula 4a, and 1-(3,5-diaminophenyl)-3-octadecyl succinimide represented by Chemical Formula 5a are added as shown in the following Table 1 to provide polyamic acid.

In the following Table 1, the total amount of 4-{2-[2-(2,4-diamino-phenyl)ethoxycarbonyl]-vinyl}-phenyl 4-(4,4,4-trifluorobutoxy)-benzoate ester represented by Chemical Formula 3a is calculated by adding the first and second amounts, and the first amount is 0.5 mol in all Examples.

TABLE 1

| Example | Preparation Example | Chemical Formula 3a (mol %) | Chemical Formula 4a (mol %) | Chemical Formula 5a (mol %) | Type |
|---|---|---|---|---|---|
| Example 1 | PSA-1 | 80 | 5 | 15 | polyamic acid |
| Example 2 | PSA-2 | 70 | 5 | 25 | polyamic acid |
| Example 3 | PSA-3 | 70 | 8 | 22 | polyamic acid |
| Example 4 | PSA-4 | 70 | 10 | 20 | polyamic acid |
| Example 5 | PSA-5 | 60 | 5 | 35 | polyamic acid |
| Example 6 | PSA-6 | 60 | 8 | 32 | polyamic acid |
| Example 7 | PSA-7 | 60 | 10 | 30 | polyamic acid |
| Example 8 | PSA-8 | 50 | 5 | 45 | polyamic acid |
| Example 9 | PSA-9 | 50 | 8 | 42 | polyamic acid |
| Example 10 | PSA-10 | 50 | 10 | 40 | polyamic acid |
| Example 11 | PSI-1 | 80 | 5 | 15 | polyimide |
| Example 12 | PSI-2 | 70 | 5 | 25 | polyimide |
| Example 13 | PSI-3 | 70 | 8 | 22 | polyimide |
| Example 14 | PSI-4 | 70 | 10 | 20 | polyimide |
| Example 15 | PSI-5 | 60 | 5 | 35 | polyimide |
| Example 16 | PSI-6 | 60 | 8 | 32 | polyimide |
| Example 17 | PSI-7 | 60 | 10 | 30 | polyimide |
| Example 18 | PSI-8 | 50 | 5 | 45 | polyimide |
| Example 19 | PSI-9 | 50 | 8 | 42 | polyimide |
| Example 20 | PSI-10 | 50 | 10 | 40 | polyimide |

As shown in Table 1, the amount units of Chemical Formula 3a, Chemical Formula 4a, and Chemical Formula 5a are mol %, based on the entire mol of diamine used in preparing polyamic acid. The amounts of a repeating unit derived from Chemical Formula 3a, a repeating unit derived from Chemical Formula 4a, and a repeating unit derived from Chemical Formula 5a included in the polyamic acid or polyimide prepared by using the mol % correspond to mol % of compounds represented by the used Chemical Formulae.

(Liquid Crystal Alignment Properties of Liquid Crystal Alignment Film)

A liquid crystal cell is fabricated to assess the liquid crystal alignment properties of liquid crystal alignment agent. The liquid crystal cell is fabricated as follows:

A ITO glass substrate having a standard size is patterned using a photolithography process to provide a 1.5 cm×1.5 cm square ITO and an electrode ITO for applying voltage and to remove the other part of ITO.

The patterned ITO substrate is coated with each liquid crystal alignment agent obtained from Examples 1 to 20 and Comparative Examples 1 to 2 and spin coated to provide a thickness of 0.1 μm and cured at 70° C. and 210° C.

Two cured ITO substrates are exposed using an exposer (UIS-S2021J7-YD01, Ushio LPUV) in a predetermined angle and a predetermined energy and positioned in a direction so that the exposure direction is perpendicular (VA mode, 90 degree) to each other and assembled while maintaining a cell gap of 4 μm to correspond to the square ITO shape between the upper and the lower sides. During the exposure, the light source is 2 kW deep UV ramp (UXM-2000).

A liquid crystal is injected into the obtained cell and then observed for liquid crystal alignment properties using a perpendicularly polarized optical microscope, and the results are shown in the following Table 2.

(Electrical Properties and Optical Characteristic of Liquid Crystal Alignment Film)

The voltage holding ratio of the liquid crystal alignment film is measured at a high temperature (60° C.) and residual DC (RDC) is measured using a liquid crystal cell having a cell gap of 4 μm to determine the electrical properties and the optical properties.

The voltage holding ratio at a high temperature (60° C.) refers to the degree of retaining the charged voltage in the floating liquid crystal layer with the extraneous power at 60° C. during the random period in the active matrix TFT-LCD, which ideally is close to 100%. The results are shown in the following Table 2. "Good" refers to 98% or more; and "Bad" refers to less than 98%.

The residual DC refers to the voltage applied to the liquid crystal layer even if voltage is not applied from the outside by adsorbing the ionized impurities of the liquid crystal layer to the alignment layer. The lower is better. The residual DC is generally measured by using a flicker, an electric capacity curved line (C-V) of liquid crystal layer according to DC voltage, and the like. The results are shown in the following Table 2, "Good" refers to 100 mV or less, and "Bad" refers to more than 100 mV.

The following Table 2 shows the electrical properties and the optical properties of the liquid crystal alignment film using the liquid crystal cell.

TABLE 2

| Synthesis Example | Liquid crystal alignment properties | Voltage holding ratio high temperature 60° C. | RDC |
|---|---|---|---|
| Example 1 | Good | Good | Good |
| Example 2 | Good | Good | Good |
| Example 3 | Good | Good | Good |
| Example 4 | Good | Good | Good |
| Example 5 | Good | Good | Good |
| Example 6 | Good | Good | Good |
| Example 7 | Good | Good | Good |
| Example 8 | Good | Good | Good |
| Example 9 | Good | Good | Good |
| Example 10 | Good | Good | Good |
| Example 11 | Good | Good | Good |
| Example 12 | Good | Good | Good |
| Example 13 | Good | Good | Good |
| Example 14 | Good | Good | Good |
| Example 15 | Good | Good | Good |
| Example 16 | Good | Good | Good |
| Example 17 | Good | Good | Good |
| Example 18 | Good | Good | Good |
| Example 19 | Good | Good | Good |
| Example 20 | Good | Good | Good |
| Comparative Example 1 | Good | Bad | Bad |
| Comparative Example 2 | Good | Bad | Bad |

Referring to Table 2, the liquid crystal alignment agents obtained from Examples 1 to 20 have better voltage holding ratios (VHR) at a high temperature and RDC characteristics than those obtained from Comparative Examples 1 and 2.

The voltage holding ratio and the residual DC are references for assessing the after-image characteristics of liquid crystal alignment film, which means that the higher voltage holding ratio and the lower residual DC are the better after-image characteristics. Accordingly, it is understood that the liquid crystal alignment agents obtained from Examples 1 to 20 have better after-image characteristics than those obtained from Comparative Examples 1 and 2.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A liquid crystal alignment agent, comprising:

a polymer comprising polyamic acid including a repeating unit represented by the following Chemical Formula 1, polyimide including a repeating unit represented by the following Chemical Formula 2, or a combination thereof:

[Chemical Formula 1]

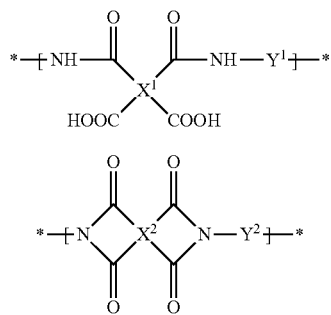

[Chemical Formula 2]

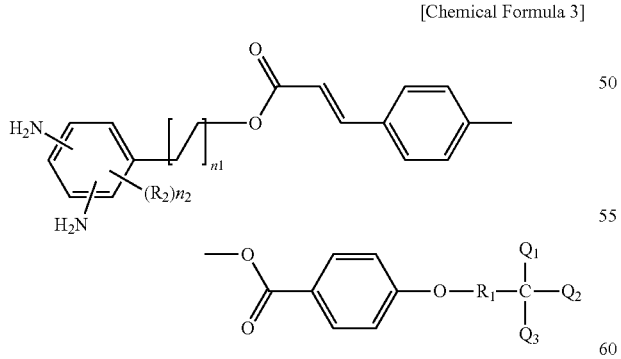

wherein, in Chemical Formulae 1 and 2, $X^1$ and $X^2$ are the same or different and are each independently a tetravalent organic group derived from alicyclic acid dianhydride or aromatic acid dianhydride, $Y^1$ and $Y^2$ are the same or different and are each independently a divalent organic group derived from diamine, wherein the diamine includes about 35 to about 90 mol % of diamine represented by the following Chemical Formula 3, about 5 to about 20 mol % of diamine represented by the following Chemical Formula 4, and about 5 to about 45 mol % of diamine represented by the following Chemical Formula 5,

[Chemical Formula 3]

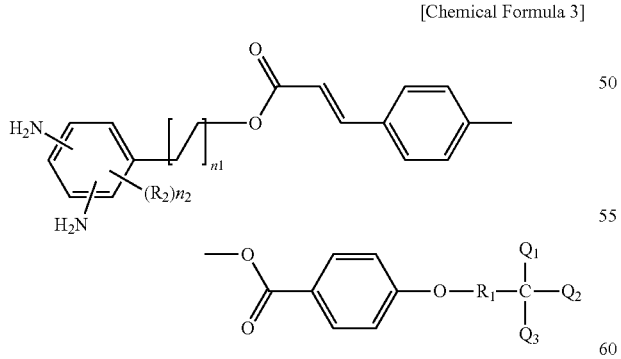

wherein, in Chemical Formula 3, $R_1$ is a single bond, substituted or unsubstituted C1 to C30 alkylene or C1 to C30 alkylene wherein at least one —$CH_2$— group thereof is substituted with —CO—, —CO—O—, —NW—, —NWCO—, —CO—NW— or —CH=CH—, wherein W is hydrogen or C1 to C10 alkyl, with the proviso that O in $R_1$ does not form —O—O— bonding within $R_1$ and with O adjacent to $R_1$, each $R_2$ is the same or different and is independently a substituted or unsubstituted aliphatic organic group, a substituted or unsubstituted alicyclic organic group, or a substituted or unsubstituted aromatic organic group, $Q_1$, $Q_2$ and $Q_3$ are the same or different and are each independently hydrogen or halogen, n1 is an integer ranging from 0 to 3, and n2 is an integer ranging from 0 to 3,

[Chemical Formula 4]

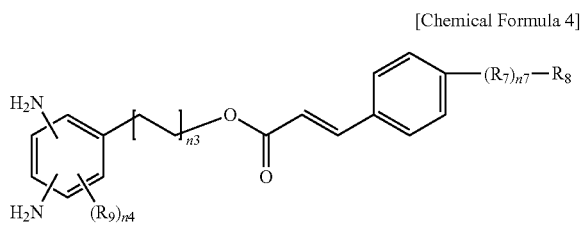

wherein, in Chemical Formula 4, each $R_7$ is independently a single bond, O, COO, NHCO, or CONH, n3 is an integer ranging from 0 to 3, n4 is an integer ranging from 0 to 3, n7 is an integer ranging from 0 to 2, $R_8$ is substituted or unsubstituted C1 to C30 alkyl, substituted or unsubstituted C6 to C30 aryl, substituted or unsubstituted C2 to C30 heteroaryl, C1 to C30 alkyl including —O—, —COO—, —CONH—, —OCO—, or a combination thereof, C6 to C30 aryl including —O—, —COO—, —CONH—, —OCO—, or a combination thereof, or C2 to C30 heteroaryl including —O—, —COO—, —CONH—, —OCO—, or a combination thereof, and each $R_9$ is the same or different and is independently a substituted or unsubstituted aliphatic organic group, a substituted or unsubstituted alicyclic organic group, or a substituted or unsubstituted aromatic organic group,

[Chemical Formula 5]

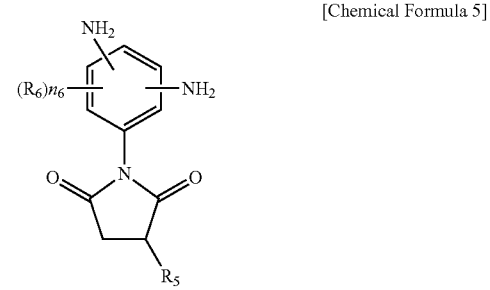

wherein, in Chemical Formula 5, $R_5$ is hydrogen; substituted or unsubstituted C1 to C30 alkyl; substituted or unsubstituted C6 to C30 aryl; or substituted or unsubstituted C2 to C30 heteroaryl, each $R_6$ is the same or different and is independently substituted or unsubstituted C1 to C30 alkyl; substituted or unsubstituted C6 to C30 aryl; or substituted or unsubstituted C2 to C30 heteroaryl, and n6 is an integer ranging from 0 to 3.

2. The liquid crystal alignment agent of claim 1, wherein the diamine represented by Chemical Formula 3 comprises a diamine represented by the following Chemical Formula 16:

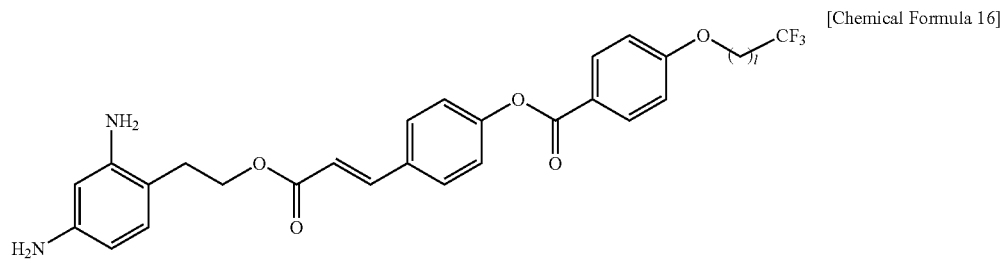

[Chemical Formula 16]

wherein, in Chemical Formula 16,
l is an integer ranging from 0 to 10.

3. The liquid crystal alignment agent of claim 1, wherein the diamine represented by Chemical Formula 4 comprises a diamine represented by the following Chemical Formula 17:

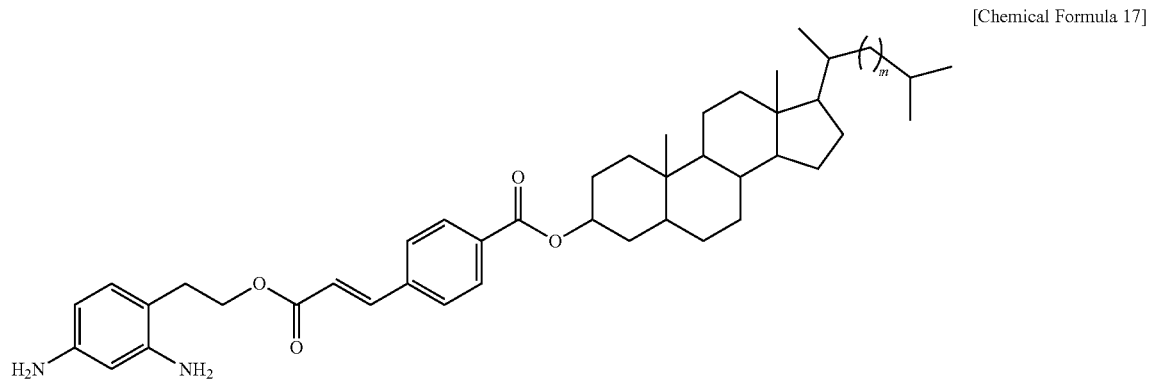

[Chemical Formula 17]

wherein, in Chemical Formula 17,
m is an integer ranging from 1 to 5.

4. The liquid crystal alignment agent of claim 1, wherein each of the polyamic acid and the polyimide has a weight average molecular weight of about 50,000 to about 500,000.

5. The liquid crystal alignment agent of claim 1, wherein the liquid crystal alignment agent comprises the polyamic acid and the polyimide in a weight ratio of about 1:99 to about 50:50.

6. The liquid crystal alignment agent of claim 1, wherein the liquid crystal alignment agent has a solid content of about 1 to about 30 wt %.

7. The liquid crystal alignment agent of claim 1, wherein the liquid crystal alignment agent has a viscosity of about 5 to about 30 cps.

8. A liquid crystal alignment film a liquid crystal alignment film manufactured by applying the liquid crystal alignment agent on a substrate according to claim 1.

9. A liquid crystal display comprising the liquid crystal alignment film according to claim 8.

* * * * *

UNITED STATES PATENT AND TRADEMARK OFFICE
CERTIFICATE OF CORRECTION

PATENT NO. : 8,470,412 B2  
APPLICATION NO. : 13/238450  
DATED : June 25, 2013  
INVENTOR(S) : Myoung-Youp Shin et al.

Page 1 of 1

It is certified that error appears in the above-identified patent and that said Letters Patent is hereby corrected as shown below:

In the Specification

Column 4, Line 14 reads: "-O-, -COO-, -CONH-, -COO-, or a combination"
and should read: "-O-, -COO-, -CONH--, -OCO-, or a combination"

Column 4, Line 16 reads: "-CONH-, -COO-, or a combination thereof, or C2 to"
and should read: "-CONH-, -OCO-, or a combination thereof, or C2 to"

Column 4, Line 18 reads: "-COO-, or a combination thereof, and"
and should read: "-OCO- or a combination thereof, and"

Column 8, Line 46 reads: "-O-, -COO-, -CONH-, -COO-, or a combination"
and should read: "-O-. -COO-, -CONH-, -OCO-, or a combination"

Column 8, Line 48 reads: "-CONH-, -COO-, or a combination thereof, or C2 to"
and should read: "-CONH-, -OCO-, or a combination thereof, or C2 to"

Column 8, Line 50 reads: "-COO-, or a combination thereof, and"
and should read: "-OCO-, or a combination thereof, and"

Column 19, Line 55 reads: "plume ratio) of N-methyl-2-pyrrolidone (NMP), γ-butyrolac-"
and should read: "volume ratio) of N-methyl-2-pyrrolidone (NMP), γ-butyrolac-"

Signed and Sealed this  
First Day of October, 2013

Teresa Stanek Rea  
*Deputy Director of the United States Patent and Trademark Office*